(12) United States Patent
Kusuda et al.

(10) Patent No.: US 7,071,926 B2
(45) Date of Patent: Jul. 4, 2006

(54) TOUCH PANEL CAPABLE OF WIDE-AREA INPUTTING

(75) Inventors: Yasuji Kusuda, Kyoto (JP); Jun Shimizu, Kyoto (JP); Hideyuki Muroi, Kyoto (JP); Naoto Yakida, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 197 days.

(21) Appl. No.: 10/169,508

(22) PCT Filed: Nov. 5, 2001

(86) PCT No.: PCT/JP01/09656

§ 371 (c)(1),
(2), (4) Date: Jul. 3, 2002

(87) PCT Pub. No.: WO02/37253

PCT Pub. Date: May 10, 2002

(65) Prior Publication Data

US 2003/0058225 A1 Mar. 27, 2003

(30) Foreign Application Priority Data

Nov. 6, 2000 (JP) .............................. 2000-338028

(51) Int. Cl.
G09G 5/00 (2006.01)
G08K 11/06 (2006.01)
(52) U.S. Cl. .................... 345/173; 345/174; 178/18.01
(58) Field of Classification Search ........ 345/173–178, 345/168, 169; 178/18.01–18.11; 361/600, 361/681, 686
See application file for complete search history.

(56) References Cited

U.S. PATENT DOCUMENTS

| | | | | | |
|---|---|---|---|---|---|
| 4,622,437 A | * | 11/1986 | Bloom et al. | ............. | 178/18.05 |
| 5,518,078 A | * | 5/1996 | Tsujioka et al. | ......... | 178/18.05 |
| 5,859,631 A | * | 1/1999 | Bergman et al. | ............ | 345/173 |
| 5,869,791 A | * | 2/1999 | Young | .................... | 178/20.01 |
| 6,380,497 B1 | * | 4/2002 | Hashimoto et al. | ......... | 200/5 A |
| 6,522,322 B1 | * | 2/2003 | Maeda et al. | ................ | 345/173 |
| 6,847,355 B1 | * | 1/2005 | Nishikawa et al. | ......... | 345/173 |

FOREIGN PATENT DOCUMENTS

| | | |
|---|---|---|
| JP | 60-33465 | 10/1985 |
| JP | 63-36430 | 9/1988 |
| JP | 1-147439 | 10/1989 |
| JP | 3-81815 | 4/1991 |
| JP | 9-44289 | 2/1997 |
| JP | 10-48625 | 2/1998 |
| JP | 10-260769 | 9/1998 |
| JP | 10-283117 | 10/1998 |

* cited by examiner

*Primary Examiner*—Sumati Lefkowitz
*Assistant Examiner*—Alecia D. Nelson
(74) *Attorney, Agent, or Firm*—Wenderoth, Lind & Ponack, L.L.P.

(57) ABSTRACT

A wide range-inputable touch panel is provided which allows a larger amount of input operations to be made with one display operation on a screen, in which at least one bus bar and a transparent electrode on a conductive panel fronting the bus bar though spaces formed in an adhesive layer cut out from an outer edge side thereof face each other so as to be capable of making electrical contact with each other by a press.

18 Claims, 13 Drawing Sheets

TOUCH PANEL CAPABLE OF WIDE-AREA INPUTTING

BACKGROUND OF THE INVENTION

1. Field of the Invention

The present invention relates to a touch panel allowing a larger number of input operations over a wide area, in which an additional input section from which input operations can be executed may be formed in addition to a screen indicating input section from which input operations can be executed according to indications on a screen.

2. Background Art

Touch panels that have conventionally been used in electronic notepads, personal computers, and the like include ones of analog resistance film type. In a touch panel of this type as shown in FIG. 11, ordinarily, two conductive panels 4, 5 having a pair of parallel bus bars 43, 53 and a transparent electrode 42, 52 formed between the bus bars 43, 53 on one surface of a transparent insulating base 41, 51 are made to face each other and are stuck together with use of a circumferential insulating adhesive layer 6 so that the bus bars 43 and 53 are arranged rectangularly. Each of the conductive panels 4 and 5 has a routing circuit 44, 54 connected to the bus bars.

This touch panel is provided on a screen of an LCD (Liquid Crystal Display), a CRT (Cathode-Ray Tube), and the like, and is pressed by a finger, a pen or the like under indications displayed on the screen that can be seen through the transparent insulating bases 41 and 51 and the transparent electrodes 42 and 52 with the screen located on their rear side, so that continuity between the transparent electrodes 42 and 52 that are normally insulated from each other by a small space is made for position input.

The bus bars 43 and 53 and the routing circuits 44 and 54 are not transparent, and are therefore hidden behind a picture-frame-like housing or the like placed on a front surface of the touch panel that is placed on the screen. In order that a larger number of input operations may be made with one display operation on the screen, recently, an area in which the bus bars 43, 53 and the routing circuit 44, 54 are formed has been made as small as possible (narrow picture frame) and an area in which the transparent electrodes face each other has been enlarged.

The enlargement of the area in which the transparent electrodes face each other, however, has a limitation and there is a necessity for new measures to make it possible to form additional input sections from which input operations can be executed in addition to a screen indicating input section from which input operations can be executed according to indications on the screen and to make a larger number of input operations possible.

An object of the present invention is to solve the above-mentioned issues and to provide a touch panel allowing a larger number of input operations over a wide area, in which an additional input section from which input operations can be executed may be formed in addition to a screen indicating input section from which input operations can be executed according to indications on a screen.

SUMMARY OF THE INVENTION

In order to achieve the above object, the present invention is configured as will be described below.

According to a first aspect of the present invention, there is provided a wide range-inputable touch panel of analog resistance film type, the touch panel comprising:

a first transparent insulating base;

a pair of first bus bars arranged in parallel to each other on one surface of the first transparent insulating base;

a first transparent electrode having at least a first input area between the first bus bars;

a second transparent insulating base;

a pair of second bus bars arranged in parallel to each other on one surface of the second transparent insulating base; and a second transparent electrode having a second input area between the second bus bars that corresponds to the first input area, the first transparent insulating base, the first bus bars, and the first transparent electrode composing a first conductive panel, the second transparent insulating base, the second bus bars, and the second transparent electrode composing a second conductive panel, the first transparent electrode further having a third input area that is adjacent to the first input area corresponding to the second input area and that corresponds to at least one bus bar of the pair of second bus bars, the touch panel further comprising:

an insulating adhesive layer that sticks together circumferential portions of the first and the second conductive panels facing each other so that the first and the second bus bars are arranged rectangularly and that has space sections provided between at least the one bus bar of the pair of second bus bars and the third input area of the first transparent electrode and allowing the bus bar and the third input area to be brought into electrical contact with each other by a press; and first and second routing circuits connected respectively to the first and the second bus bars on the conductive panels.

According to a second aspect of the present invention, there is provided a wide range-inputable touch panel of analog resistance film type as defined in the first aspect, wherein the first and the second routing circuits are provided on the first and the second conductive panels, respectively, and are connected to the first and the second bus bars, respectively.

According to a third aspect of the present invention, there is provided a wide range-inputable touch panel of analog resistance film type as defined in the first aspect, wherein the first and the second routing circuits are provided on the second conductive panel and are connected to the first and the second bus bars, respectively.

According to a fourth aspect of the present invention, there is provided a wide range-inputable touch panel as defined in any one of the first through third aspects, wherein an insulating interconnection overcoating layer is formed on a surface of the first conductive panel where the first routing circuit is formed or on a surface of the second conductive panel where the second routing circuit is formed, in an area that does not overlap portions of the bus bars on the surface which can be brought into electrical contact by a press with the facing transparent electrode and in an area including the routing circuit.

According to a fifth aspect of the present invention, there is provided a wide range-inputable touch panel of analog resistance film type as defined in any one of the first through third aspects, wherein the space sections are spaces formed in the adhesive layer cut out from an outer edge side thereof.

According to a sixth aspect of the present invention, there is provided a wide range-inputable touch panel of analog resistance film type as defined in the fourth aspect, wherein the space sections are spaces formed in the adhesive layer cut out from an outer edge side thereof.

According to a seventh aspect of the present invention, there is provided a wide range-inputable touch panel as defined in any one of the first through third aspects, wherein the space sections are spaces in which two or more cut-out sections formed in the adhesive layer cut out from an outer edge side thereof exist side by side along one side.

According to an eighth aspect of the present invention, there is provided a wide range-inputable touch panel as defined in the fourth aspect, wherein the space sections are spaces in which two or more cut-out sections formed in the adhesive layer cut out from an outer edge side thereof exist side by side along one side.

According to a ninth aspect of the present invention, there is provided a wide range-inputable touch panel as defined in the seventh aspect, wherein dot-like spacers are provided in the spaces.

According to a tenth aspect of the present invention, there is provided a wide range-inputable touch panel as defined in any one of the first through seventh aspects, wherein at least the one bus bar of the pair of bus bars is covered with carbon layers in cut-out sections of the adhesive layer.

According to an 11th aspect of the present invention, there is provided a wide range-inputable touch panel as defined in any one of the first through third aspects, wherein the space sections are punched holes extending through the adhesive layer.

According to a 12th aspect of the present invention, there is provided a wide range-inputable touch panel as defined in any one of the first through third aspects, wherein the adhesive layer 3 has a through hole formed corresponding to the first input area of the first transparent electrode and to the second input area of the second transparent electrode and has a partition section that partitions the through hole and the space sections.

According to a 13th aspect of the present invention, there is provided a wide range-inputable touch panel as defined in any one of the first through third aspects, wherein an ordinary input section as a region through which a screen placed under the touch panel can be seen for input operations is composed of the first input area of the first transparent electrode and of the second input area of the second transparent electrode that faces the first input area, and an additional input section different from the ordinary input section is composed of at least one bus bar of the pair of second bus bars and of the third input area of the first transparent electrode that faces at least the one bus bar.

According to a 14th aspect of the present invention, there is provided a wide range-inputable touch panel as defined in the 13th aspect, wherein the additional input section is composed of additional electrode sections that are connected through extension line sections to at least one bus bar of the pair of second bus bars, and the third input area of the first transparent electrode that faces the additional electrode sections through the space sections.

BRIEF DESCRIPTION OF DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
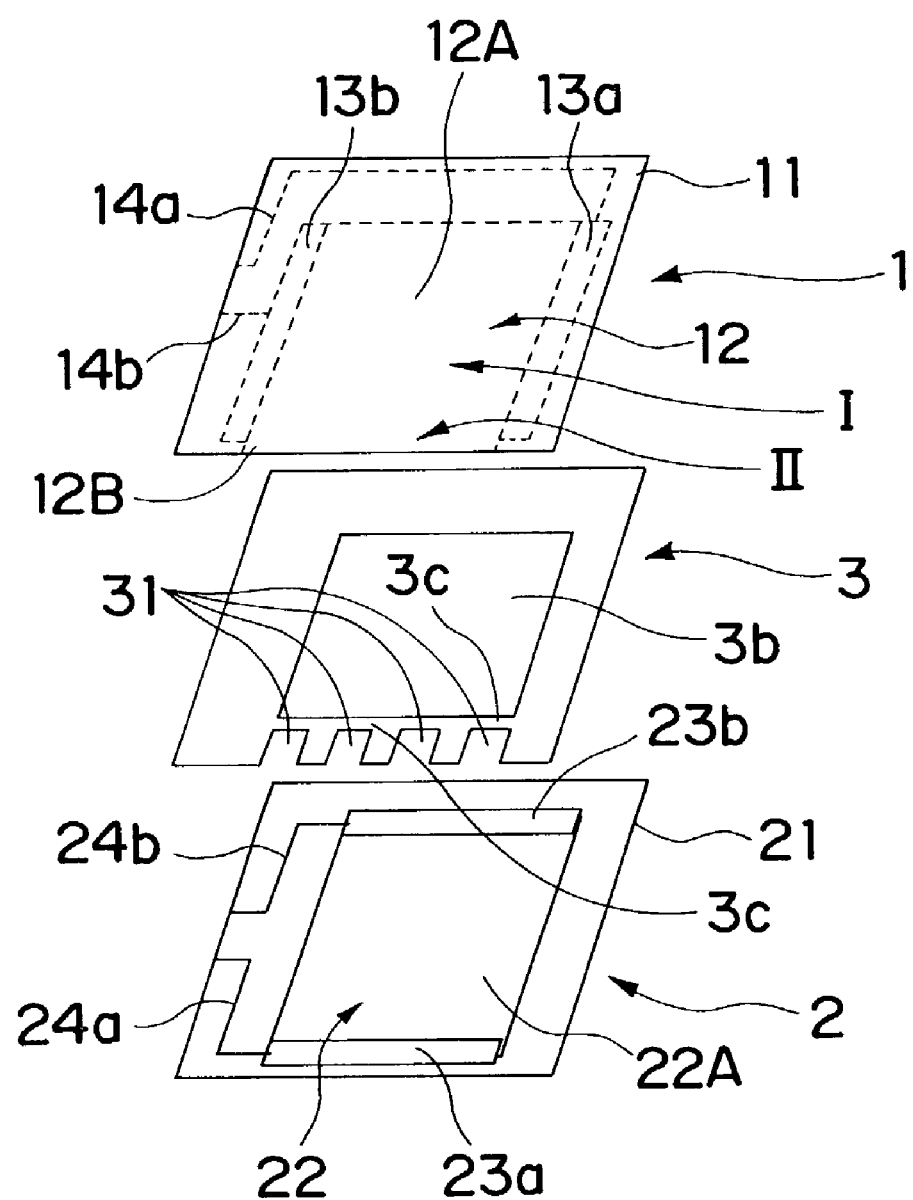
FIG. 1 is an exploded perspective view showing a wide range-inputable touch panel according to an embodiment of the present invention.

Before the description of the present invention proceeds, it is to be noted that like parts are designated by like reference numerals throughout the accompanying drawings.

Hereinbelow, wide range-inputable touch panels according to an embodiment of the present invention will be described in detail with reference to the drawings.

Figure 3:
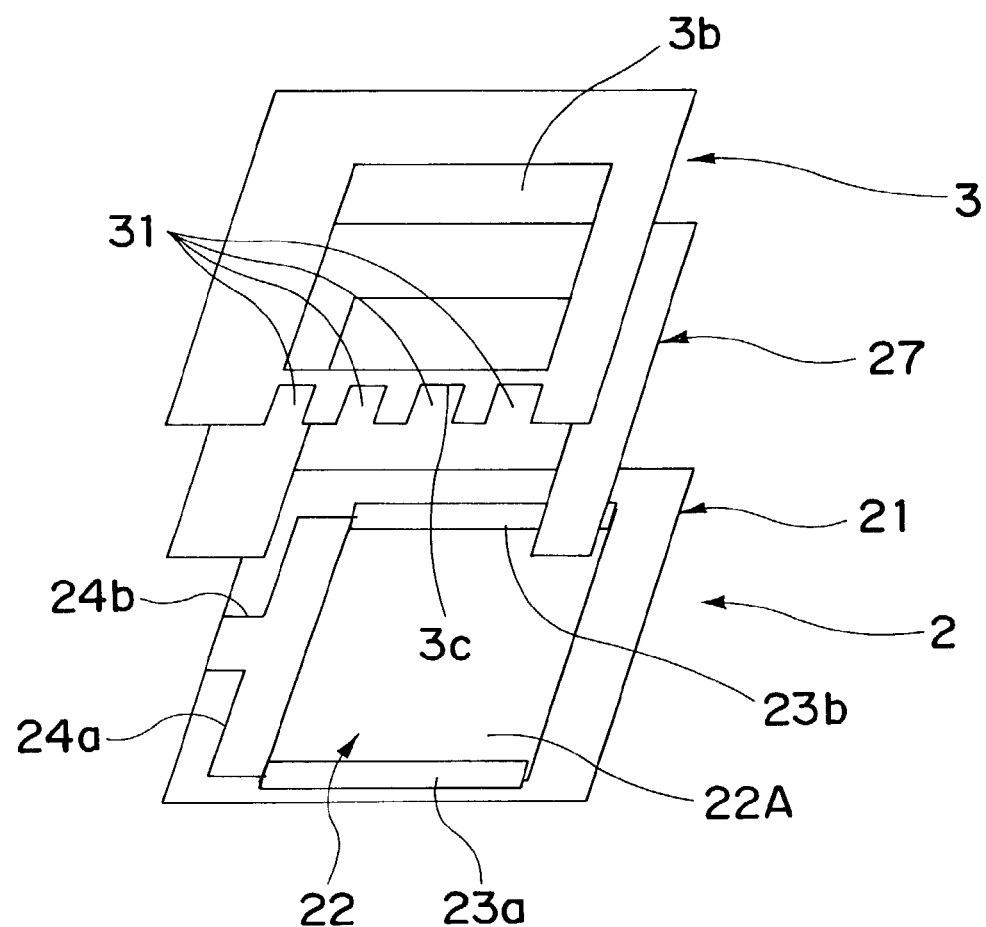
FIG. 3 is an exploded perspective view showing the wide range-inputable touch panel according to the embodiment of the present invention, from which one conductive panel has been removed.

FIGS. 1 and 3 are an exploded perspective view showing a wide range-inputable touch panel according to the embodiment of the present invention and an exploded perspective view of the touch panel from which one conductive panel has been removed.

Figure 2:
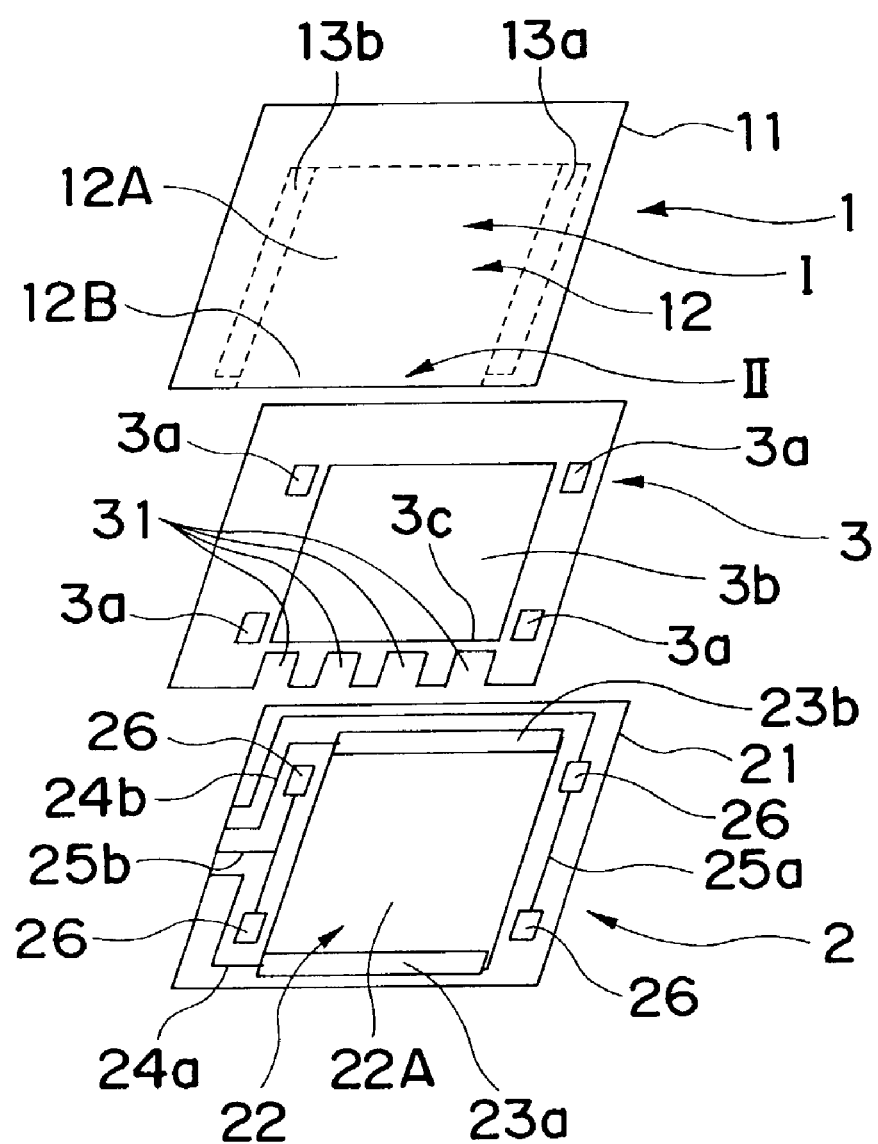
FIG. 2 is an exploded perspective view showing a wide range-inputable touch panel according to a modification of the embodiment of the present invention.
Figure 4:
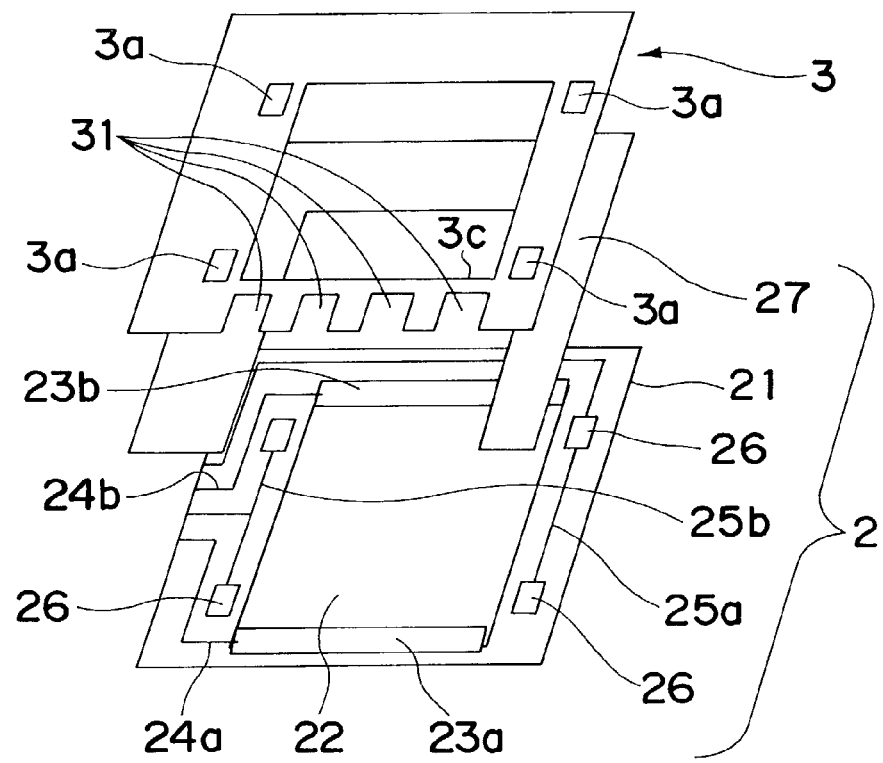
FIG. 4 is an exploded perspective view showing a wide range-inputable touch panel according to a modification of the embodiment of the present invention, from which one conductive panel has been removed.

FIGS. 2 and 4 are an exploded perspective view showing a wide range-inputable touch panel according to a modification of the embodiment of the present invention and an exploded perspective view of the touch panel from which one conductive panel has been removed.

Figure 5:
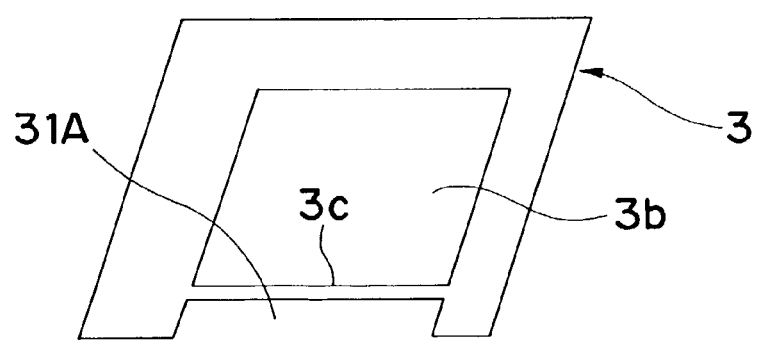
FIG. 5 is a perspective view showing a shape of an adhesive layer that is formed in a wide range-inputable touch panel according to another modification of the embodiment of the present invention.
Figure 6:
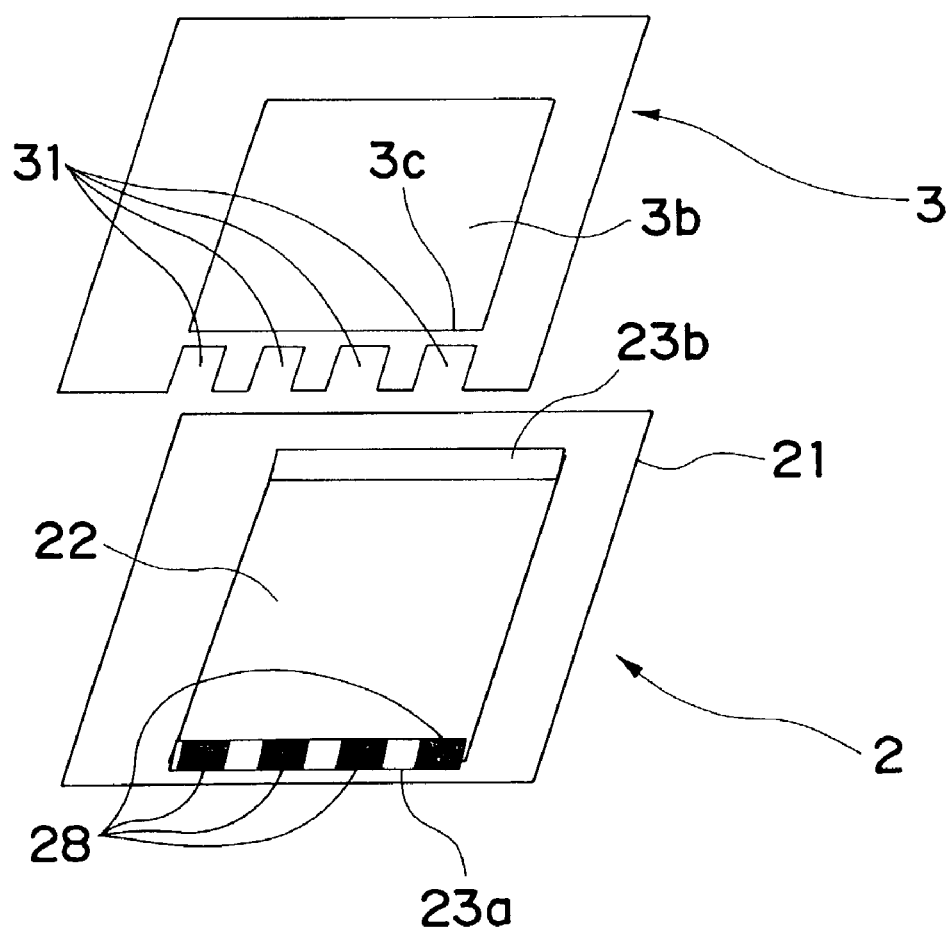
FIG. 6 is an exploded perspective view showing a wide range-inputable touch panel according to still another modification of the embodiment of the present invention, from which one conductive panel has been removed.
Figure 7:
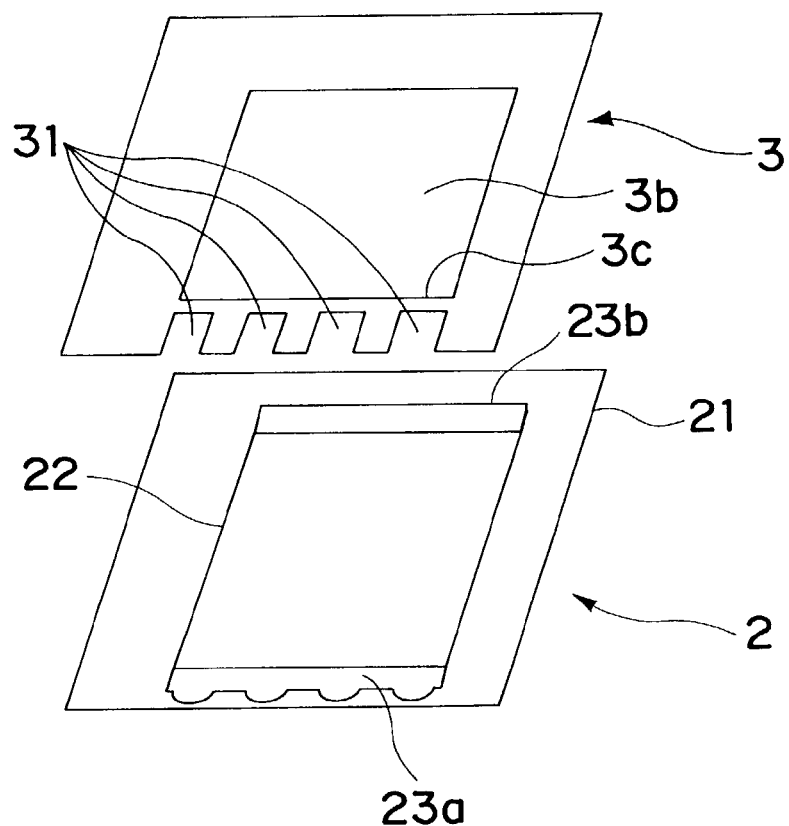
FIG. 7 is an exploded perspective view showing a wide range-inputable touch panel according to still another modification of the embodiment of the present invention, from which one conductive panel has been removed.
Figure 8:
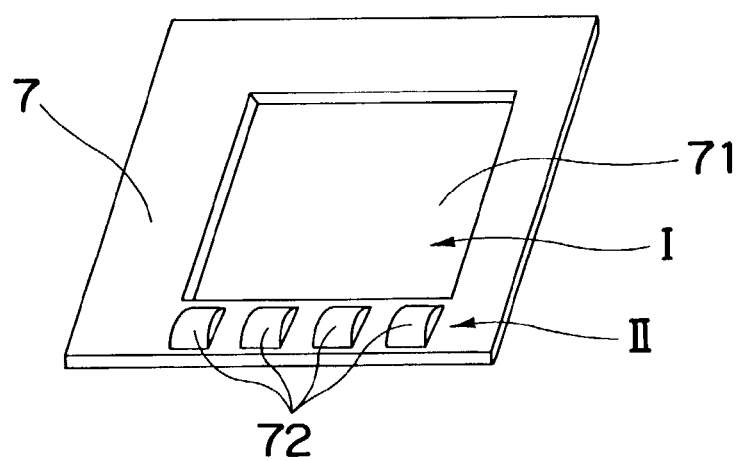
FIG. 8 is a perspective view showing a housing provided on a front surface of a wide range-inputable touch panel according to still another modification of the embodiment of the present invention.

FIG. 5 is a perspective view showing a shape of an adhesive layer that is formed in a wide range-inputable touch panel according to another modification of the embodiment of the present invention. FIG. 6 is an exploded perspective view showing a wide range-inputable touch panel according to still another modification of the embodiment of the present invention, from which one conductive panel has been removed. FIG. 7 is an exploded perspective view showing a wide range-inputable touch panel according to still another modification of the embodiment of the present invention, from which one conductive panel has been removed. FIG. 8 is a perspective view showing a housing provided on a front surface of a wide range-inputable touch panel according to still another modification of the embodiment of the present invention.

Figure 9:
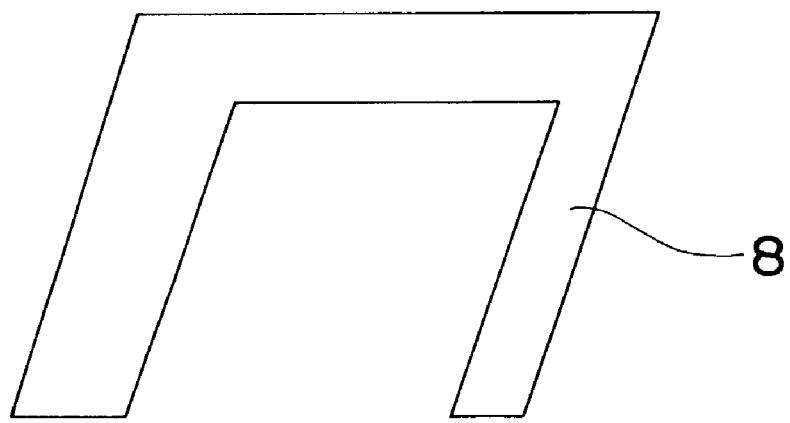
FIG. 9 is a perspective view showing an example of a shape of an adhesive layer that is not formed in a wide range-inputable touch panel according to the embodiment of the present invention.

FIG. 9 is a perspective view showing an example of a shape of an adhesive layer that is not formed in the wide range-inputable touch panel according to the embodiment of the present invention.

Figure 10:
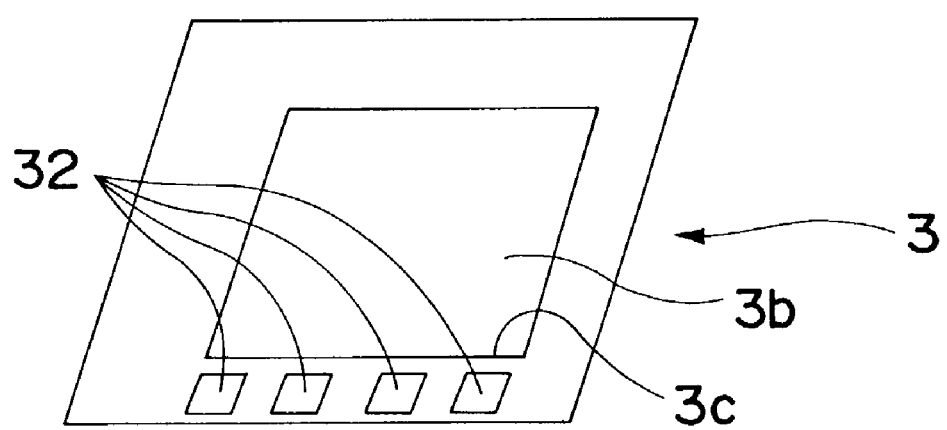
FIG. 10 is a perspective view showing a shape of an adhesive layer that is formed in a wide range-inputable touch panel according to still another modification of the embodiment of the present invention.

FIG. 10 is a perspective view showing a shape of an adhesive layer that is formed in a wide range-inputable touch panel according to still another modification of the embodiment of the present invention.

Figure 11:
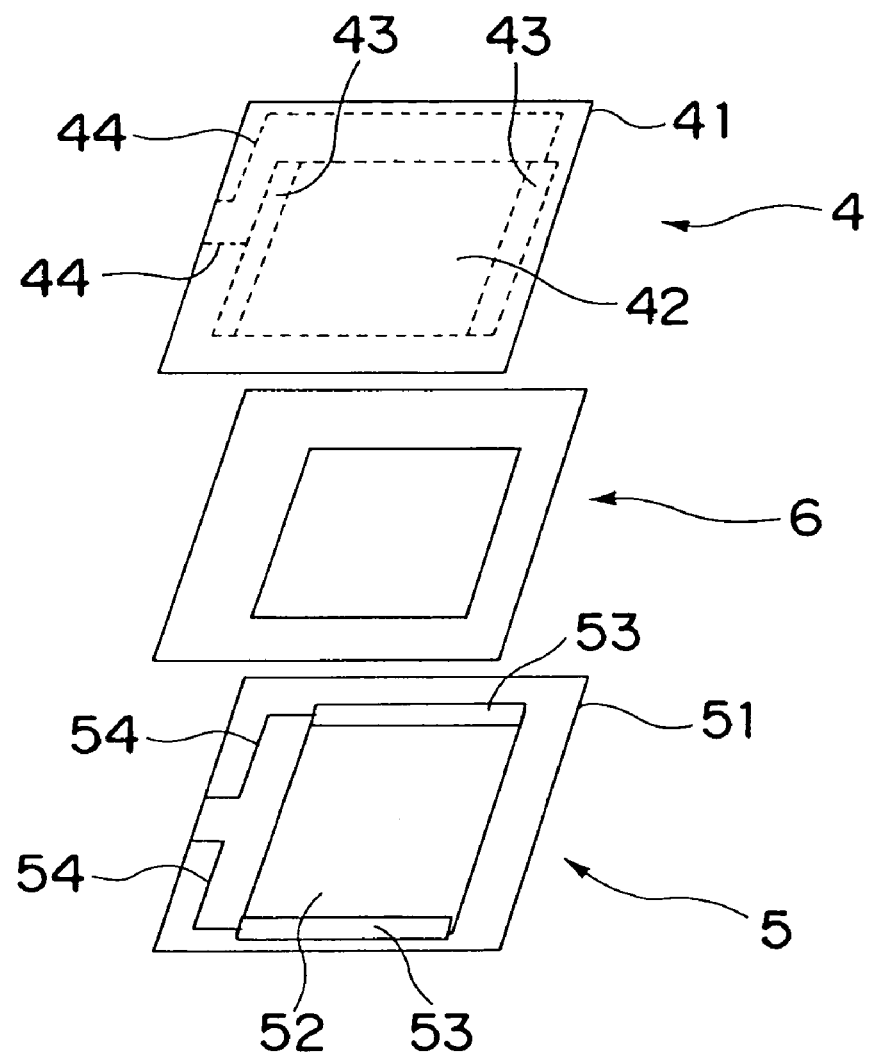
FIG. 11 is an exploded perspective view showing an example of a conventional touch panel.

FIG. 11 is an exploded perspective view showing an example of a conventional touch panel.

Figure 12A:
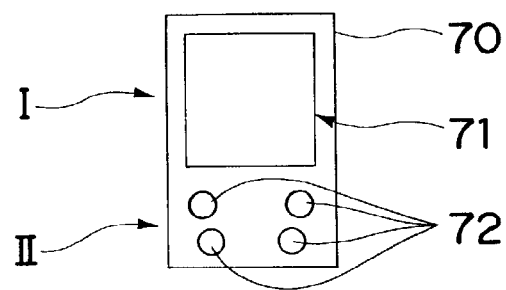
FIGS. 12A and 12B are a plan view and an exploded view showing a PDA equipped with a wide range-inputable touch panel according to still another embodiment of the present invention.
Figure 12B:
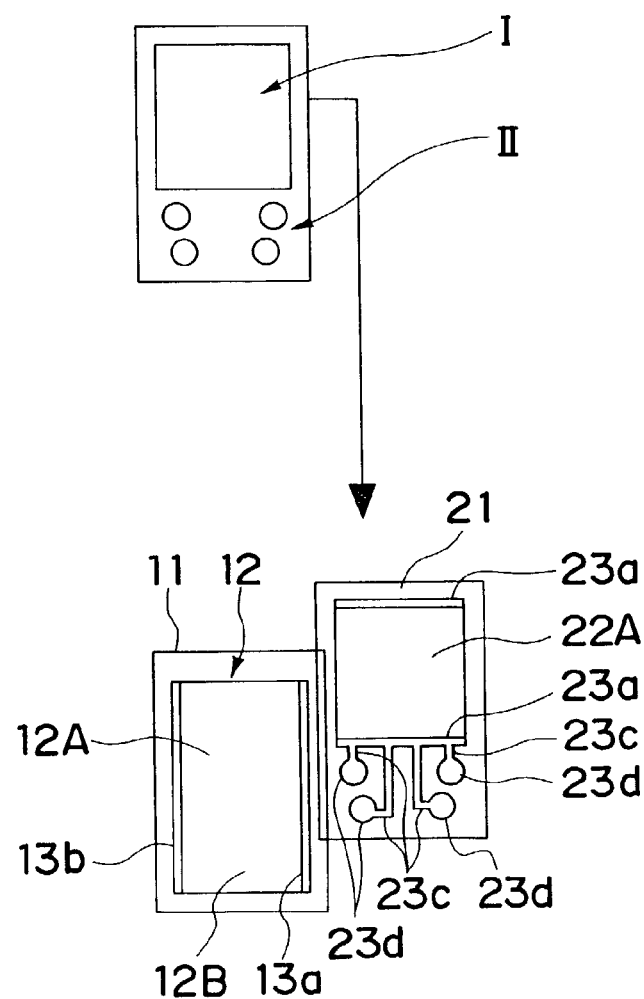

FIGS. 12A and 12B are a plan view and an exploded view showing a PDA equipped with a wide range-inputable touch panel according to still another embodiment of the present invention.

Figure 13:
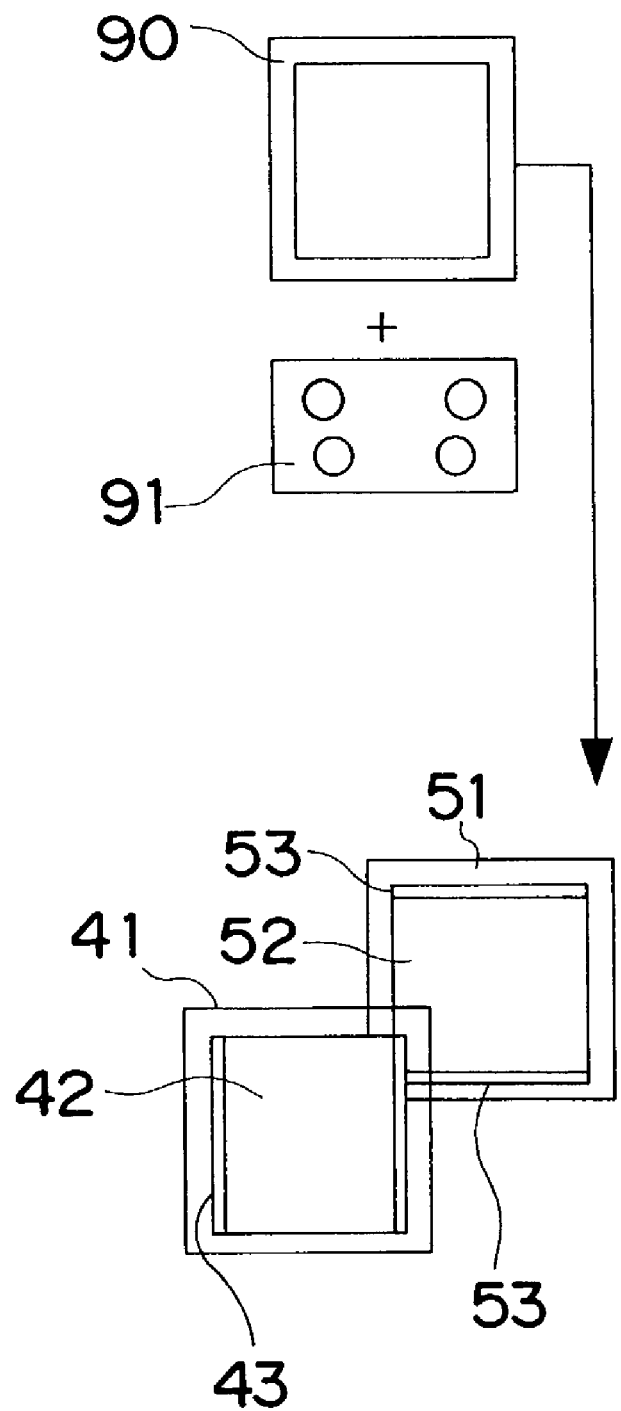
FIG. 13 is an exploded view showing a PDA equipped with an example of a conventional touch panel.

FIG. 13 is an exploded view showing a PDA equipped with an example of a conventional touch panel.

In the above-mentioned drawings, reference character 1 denotes a first conductive panel, character 11 denotes a first transparent insulating base of the first conductive panel 1, character 12 denotes a first transparent electrode on the first conductive panel 1, characters 13a and 13b denote first bus bars on the first conductive panel 1, characters 14a and 14b denote a first routing circuit on the first conductive panel 1, character 2 denotes a second conductive panel, character 21 denotes a second transparent insulating base of the second conductive panel 2, character 22 denotes a second transparent electrode on the second conductive panel 2, characters 23a and 23b denote second bus bars on the second conductive panel 2, characters 24a and 24b denote a second routing circuit on the second conductive panel 2, characters 25a and 25b denote a routing circuit, character 26 denotes linkage sections, character 27 denotes an interconnection overcoating layer, character 28 denotes a carbon layer, character 3 denotes an adhesive layer, character 31 denotes a cut-out section of the adhesive layer 3, character 32 denotes a punched hole section of the adhesive layer 3, character 7 denotes the housing, character 71 denotes a screen see-through input section of the housing 7, character 72 denotes a button input section of the housing 7, and character 8 denotes an adhesive layer.

The first conductive panel 1 on a side for touch input in the touch panel shown in FIG. 1 has the pair of first bus bars 13a and 13b parallel to each other on one surface of the first transparent insulating base 11 and the first transparent electrode 12 formed between the first bus bars 13a and 13b and has the set of first routing circuit 14a and 14b connected to the first bus bars 13a and 13b in an insulated section outside the first transparent electrode 12. In detail, the first transparent electrode 12 is formed over a first input area 12A facing the second transparent electrode 22 of the second conductive panel 2 on a screen side that will be described below and over a third input area 12B facing one of the second bus bars 23a and 23b of the second conductive panel 2 on the screen side. On the other hand, the second conductive panel 2 on the screen side of the touch panel shown in FIG. 1 has the pair of second bus bars 23a and 23b parallel to each other on one surface of the second transparent insulating base 21 and the second transparent electrode 22 formed between the second bus bars 23a and 23b and has the set of second routing circuit 24a and 24b connected to the second bus bars 23a and 23b in an insulated section outside the second transparent electrode 22. The second transparent electrode 22 is formed over a second input area 22A between the second bus bars 23a and 23b. The first conductive panel 1 on the side for touch input and the second conductive panel 2 on the screen side are made to face each other so that the first and second bus bars 13a, 13b, 23a, and 23b are arranged rectangularly, and the panels are stuck together with use of the circumferential insulating adhesive layer 3 so that a space is formed between the first and second transparent electrode 12 and 22.

The touch panel shown in FIG. 1 has the first input area 12A configuring an ordinary input section I that is to be pressed by a finger, a pen, or the like under directions displayed on the screen which can be seen through a central portion of the panel, and the third input area 12B configuring an additional input section II through which the screen can not be seen, in a neighborhood of an edge of the touch panel, in addition to the first input area 12A. To be more specific, one second bus bar 23a on the second conductive panel 2 on the screen side and the third input area 12B of the first transparent electrode 12 on the first conductive panel 1 on the side for touch input, which fronts the bus bar 23a through spaces (the cut-out sections 31) formed in the adhesive layer 3 cut out from an outer edge side thereof, face each other so as to be capable of making electrical contact with each other by a press and configure the additional input section II. In the touch panel with the above configuration, therefore, input operations can be executed even on the second bus bar 23a that would be excluded from input areas in conventional panels, an input area of the panel is accordingly larger than in conventional panels, and a larger number of input operations can be executed with one display operation on the screen.

For example, the housing 7 as shown in FIG. 8 may be provided on the front surface of the touch panel so as to conceal the first and second bus bars 13a, 13b, 23a, and 23b and the first and second routing circuits 14a, 14b, 24a, and 24b. Thus, conventional input operations under directions displayed on the screen can be executed on the screen see-through input section 71 that opens in a central portion of the housing and, on the other hand, input operations on the above bus bar of the touch panel can be executed with presses on a plurality of button input sections 72 that are arranged corresponding to the plurality of cut-out sections 31 of the adhesive layer 3 and that use a portion of a main body of the housing 7. Instead of using the portion of the main body of the housing 7, button input sections may be formed separately from the main body of the housing 7, by printing or the like on a portion of a surface of the touch panel that resides over the bus bar. The screen see-through input section 71 is a section that corresponds to the first input area 12A and to the second input area 22A, and the plurality of button input sections 72 are sections that correspond to the third input area 12B.

In the touch panel shown in FIG. 1, one bus bar 23a on the second conductive panel 2 on the screen side performs a function as a switch. Alternatively, a configuration may be adopted in which any one of other three bus bars 13a, 13b, and 23b or two or more out of four bus bars 13a, 13b, 23a, and 23b, and the transparent electrodes on the conductive panels opposed to the bus bars through the spaces (the cut-out sections 31) formed in the adhesive layer 3 cut out from the outer edge side thereof face each other so as to be capable of making electrical contact with each other by a press.

In this embodiment, the first conductive panel 1 may be provided on a side of an upper electrode and the second conductive panel 2 may be provided on a side of a lower electrode (the side of the screen such as LCD). Or otherwise, the first conductive panel 1 may be provided on the side of the lower electrode (the side of the screen such as LCD) and the second conductive panel 2 may be provided on the side of the upper electrode.

The wide range-inputable touch panel according to the embodiment of the present invention may have a configuration in which two sets of routing circuits are formed on one of the conductive panels. For example, no routing circuits may be provided on the first conductive panel 1 on the side for touch input, two sets of routing circuits 24a, 24b, 25a, and 25b may be provided collectively in the insulated section outside the transparent electrode 22 on the second conductive panel 2 on the screen side, one set of routing circuits 25a and 25b out of the two sets may be configured so as to be connected indirectly and electrically to the first bus bars 13a and 13b on the first conductive panel 1 on the side for touch input, by way of conductive adhesive provided as the linkage sections 26 of the routing circuit across through holes 3a of the adhesive layer 3, and other configurations may be made the same as that of the touch panel shown in FIG. 1 (see FIG. 2).

In the configuration in which the routing circuits are collectively formed on one of the conductive panels, only one bus bar or only two bus bars on the conductive panel provided with both the routing circuits, and the transparent electrode on the conductive panel on the side opposed to the bus bars across the spaces formed in the adhesive layer cut out from the outer edge side thereof can be made to face each other so as to be brought into electrical contact with each other by a press, in contrast to the configuration in which one set of routing circuits is formed on each of the conductive panels. That is because it is difficult to provide input areas in the bus bars on the conductive panel on the side provided with no routing circuits, for the routing circuits and the linkage sections reside in positions that the bus bars on the panel on the opposite side face, as shown in FIG. 2.

The routing circuits in the touch panel shown in FIG. 2 are gathered on the conductive panel 2 on the screen side. The routing circuits, however, may be formed collectively on the conductive panel 1 on the side for touch input.

As the first transparent insulating base 11 of the first conductive panel 1 on the side for touch input, which is required to have a flexibility for input operations, there are commonly used engineering plastic based on polycarbonate, polyamide, polyether ketone, and the like; transparent film based on acrylic resin, polyethylene terephthalate, polybutylene terephthalate, and the like; laminated body of those materials; and the like. There may be formed a hard coat layer on a surface of the first transparent insulating base 11 of the first conductive panel 1 on the side for touch input that is opposite to a surface having the first transparent electrode 12. The hard coat layer may be made from inorganic material such as siloxane-based resin or organic material such as thermosetting resin based on acrylic epoxy and urethane and acrylate-based photo-setting resin. Non-glare treatment for preventing light reflection may be applied to the surface of the first transparent insulating base 11 of the first conductive panel 1 on the side for touch input that is opposite to the surface having the first transparent electrode 12. For example, the first transparent insulating base 11 and the hard coat layer may be subjected to roughening process, or minute particles such as extender pigment, silica, and alumina may be added into the hard coat layer.

As the second transparent insulating base 21 of the second conductive panel 2 on the screen side are used glass board such as soda glass, borosilicate glass, and tempered glass; and besides; engineering plastic based on polycarbonate, polyamide, polyether ketone, and the like; transparent resin plate or transparent film based on acrylic resin, polyethylene terephthalate, polybutylene terephthalate, and the like; laminated body of those materials; and the like.

The first and second transparent insulating bases 1 and 2 of the conductive panels on the side for touch input and the screen side may not only have a function as supporting bodies for the transparent electrodes but may have another optical function and the like. As shown in Unexamined Japanese Patent Publication No. 10-48625 and others, for example, a touch panel in which an anti-reflection filter of circular polarization type is provided has a configuration in which, at least, a first quarter-wave plate, two layers of transparent electrodes facing each other with spacers therebetween, a second quarter-wave plate having an optical axis orthogonal to an optical axis of the first quarter-wave plate, and a polarizing plate are arranged in order of mention from a side of a liquid crystal display. Therefore, the first quarter-wave plate may be used as the transparent insulating base of the conductive panel on the screen side and the second quarter-wave plate may be used as the transparent insulating base of the conductive panel on the side for touch input. The above-mentioned quarter-wave plates are transparent resin plates or transparent films that have a function of converting linearly polarized light into circularly polarized light or generally circularly polarized light by causing temporal phase shift (phase difference) between two components of polarized light orthogonal to each other obtained from resolution of linearly polarized light and that have a function of delaying phase of one of the components of polarized light by a quarter of a wavelength thereof relative to incident light having a center wavelength (about 550 nm) of visible light region (about 400 nm to 700 nm).

The transparent electrodes 12 and 22 can be obtained as transparent conductive films formed partially on the transparent insulating bases 11 and 21. Means for patterning the transparent conductive films include a method of removing an unnecessary portion of a transparent conductive film by resist etching after providing the transparent conductive film on an overall surface, a method of forming a pattern of a transparent conductive film with use of a metal mask, or the like. Alternatively, a transparent conductive film formed overall on a transparent insulating base may be covered partially with an insulating patterning layer, and then an exposed portion of the transparent conductive film may be obtained as one or both of the transparent electrodes 12 and 22. In the case that the routing circuits are collectively formed on one of the conductive panels, the transparent electrode of the conductive panel on which no routing circuits are formed may be obtained as a portion of the transparent conductive film formed overall on the transparent insulating base (not shown). A material of such a transparent conductive film may be metal oxide film of tin oxide, indium oxide, antimony oxide, zinc oxide, cadmium oxide, indium tin oxide (ITO), or the like; composite film composed mainly of those metal oxides; or metal film of gold, silver, copper, tin, nickel, aluminum, palladium, or the like. The transparent conductive film may be formed in multiple layers. Examples of methods of forming the transparent conductive film are vacuum deposition, sputtering, ion plating, and CVD method.

In the touch panels shown in FIGS. 1 and 2, one bus bar 23a on the second conductive panel 2 on the screen side and the first transparent electrode 12 on the first conductive panel 1 on the side for touch input, which fronts the bus bar 23a through the spaces (the cut-out sections 31) formed in the adhesive layer 3 cut out from the outer edge side thereof, face each other so as to be capable of making electrical contact with each other by a press, and an area in which the transparent electrode 12 is formed is larger than an area for the transparent electrode 52 (see FIG. 11) of the prior art.

For the bus bars 13a, 13b, 23a, and 23b, and the routing circuits 14a, 14b, 24a, 24b, 25a, and 25b are used metals such as gold, silver, copper, and nickel or conductive paste of carbon or the like. A method of forming those components may be a printing process such as screen printing, offset printing, gravure printing, and flexography; photoresist process; brush application; or the like. The bus bars do not have to be formed with a uniform width. As shown in FIG. 7 (some elements including routing circuits are omitted in the drawing), for example, the bus bar 23a may project toward outside of the touch panel, at the cut-out sections 31 of the adhesive layer 3.

The adhesive layer 3 is used for sticking together circumferential portions of the first conductive panel 1 on the side for touch input and of the second conductive panel 2 on the screen side and, for example, frame-like double-sided adhesive tape having a through hole 3b punched in a region through which a screen of LCD or the like is to be seen for input operations is employed as the adhesive layer. In the touch panels shown in FIGS. 1 and 2, moreover, sections of the adhesive layer 3 corresponding to the input areas of the bus bar 23a and outer edge sides of the sections have been cut out from the outer edge sides. Those cut-out sections 31 form spaces between the bus bar 23a and the transparent electrode 12 on the panel on the opposite side. For the double-sided adhesive tape may be substituted adhesive such as aqueous, acrylic, and other print paste.

The adhesive layer 3 does not have such a square bracket-like (]-like) shape as the adhesive layer 8 shown in FIG. 9 has, because such a square bracket-like shape may permit entry of foreign material from outside of the touch panel into a space between the transparent electrodes 12 and 22 of the touch panel, that is, the space in the region through which a screen of LCD or the like can be seen for input operations and may deteriorate visibility of the touch panel.

An issue is caused by cutout from an inner edge side contrary to the adhesive layer 3 shown in FIGS. 1 and 2. That is, such cutout with deviation of a position in which the adhesive layer is formed or cut is prone to result in formation of a touch panel having such a square bracket-shaped adhesive layer 8 as shown in FIG. 9 because, in a conventional method of producing the touch panel, large conductive panels on the side for touch input and on the screen side on which a lot of transparent electrodes, bus bars, routing circuits are set are manufactured, stuck together, and thereafter cut into separate touch panels. In recent years in which screens of LCD and the like have been enlarged and products equipped with touch panels have been miniaturized, in particular, a region through which a screen of LCD or the like can be seen for input operations and external of the touch panel have been too close to each other and the above-mentioned failure has been liable to occur.

As described above, the adhesive layer 3 has the quadrangular through hole 3b formed corresponding to the ordinary input section composed of the first input area 12A of the first transparent electrode 12 and of the second input area 22A of the second transparent electrode 22 and has a partition section 3c that partitions the through hole 3b and the space sections 31, 31A, 32. The ordinary input section I is the region through which a screen placed under the touch panel can be seen for input operations. In other words, it is preferable for the partition section 3c of the adhesive layer 3 to be a partition between the ordinary input section I composed of the first input area 12A of the first transparent electrode 12 and the second input area 22A of the second transparent electrode 22 that face each other through the region 3b of the adhesive layer 3 through which a screen of LCD or the like can be seen for input operations, and the additional input section II composed of the third input area 12B of the first transparent electrode 12 and the second bus bar 32a that face each other through the cut-out sections 31 of the adhesive layer 3.

As the cut-out sections 31 of the adhesive layer 3, two or more sections may exist side by side along one side as shown in FIGS. 1 and 2, or only one section may exist along one side as shown in FIG. 5.

Instead of the spaces (the cut-out sections 31) formed in the adhesive layer 3 cut out from the outer edge side thereof, there may be used the spaces (the punched hole sections 32) formed as holes punched in the adhesive layer 3 as shown in FIG. 10. This configuration, however, requires areas for formation of the adhesive layer on both sides of the punched hole sections 32, that is, on the side near the outer edge of the adhesive layer and on the side near the inner edge of the adhesive layer, and it is therefore more preferable for the adhesive layer 3 to be cut out from the outer edge side thereof, in terms of miniaturization of the touch panel.

The wide range-inputable touch panels according to the embodiment of the present invention and modifications thereof are not limited to touch panels in which the adhesive layer 3 is formed directly on the routing circuit 24a and 24b of the conductive panel 2 as shown in FIGS. 1 and 2. For example, an interconnection overcoating layer 27 may be formed in an area that does not overlap portions of the bus bar 23a which can be brought into electrical contact by a press with the facing transparent electrode 12 and in an area including the routing circuit 24a and 24b, on a surface of the conductive panel 2 where the routing circuit 24a and 24b is formed, and the adhesive layer 3 may be formed on the interconnection overcoating layer 27 (see FIGS. 3 and 4). The interconnection overcoating layer 27 conventionally has purposes of prevention of oxidation of interconnections such as the routing circuit and the bus bars and insulation between the interconnections arranged in parallel at small intervals, and covers the routing circuit 24a and 24b and the bus bar 23b in FIG. 3 and covers the routing circuits 24a, 24b, 25a, and 25b, the linkage sections 26, and the bus bar 23b in FIG. 4. As the interconnection overcoating layer is used nonconductive resin, film, or the like, such as solder resist. A method of forming the interconnection overcoating layer 27 may be printing process such as screen printing, offset printing, gravure printing, and flexography; brush application; film laminating; or the like.

Figure 16:
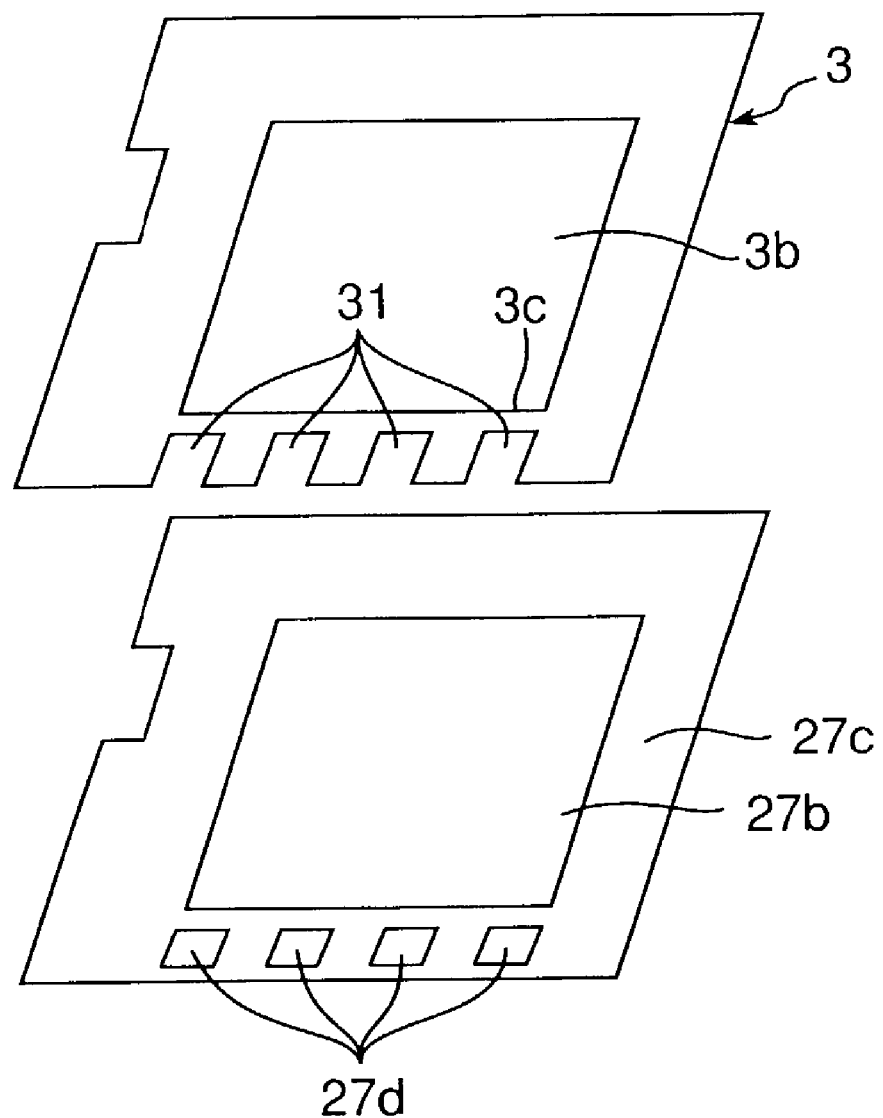
FIG. 16 is an explanatory diagram of an adhesive layer and an interconnection overcoating layer in a wide range-inputable touch panel according to still another embodiment of the present invention.

The interconnection overcoating layer 27 has only to be formed so as not to overlap portions of the bus bar that can be brought into electrical contact by a press with the facing transparent electrode (see FIGS. 3 and 4), and the layer 27 does not have to be formed in exactly the same area where the adhesive layer 3 is formed. As shown in FIG. 16, for example, the cut-out sections 31, . . . , 31 may be provided in the adhesive layer 3 and punched holes 27*d* may be provided in positions corresponding to the cut-out sections 31, . . . , 31 in the interconnection overcoating layer 27*c*. Reference characters 3*e* and 27*e* in FIG. 16 denote cut-out sections formed corresponding to a connecting part of a connector. A configuration of the touch panel having the interconnection overcoating layer is not limited to one shown in FIG. 3 and, for example, the interconnection overcoating layer may be formed not on the conductive panel 2 on the screen side but on the conductive panel 1 on the side for touch input. The interconnection overcoating layer may be formed on each of the conductive panel 2 on the screen side and the conductive panel 1 on the side for touch input.

Figure 14:
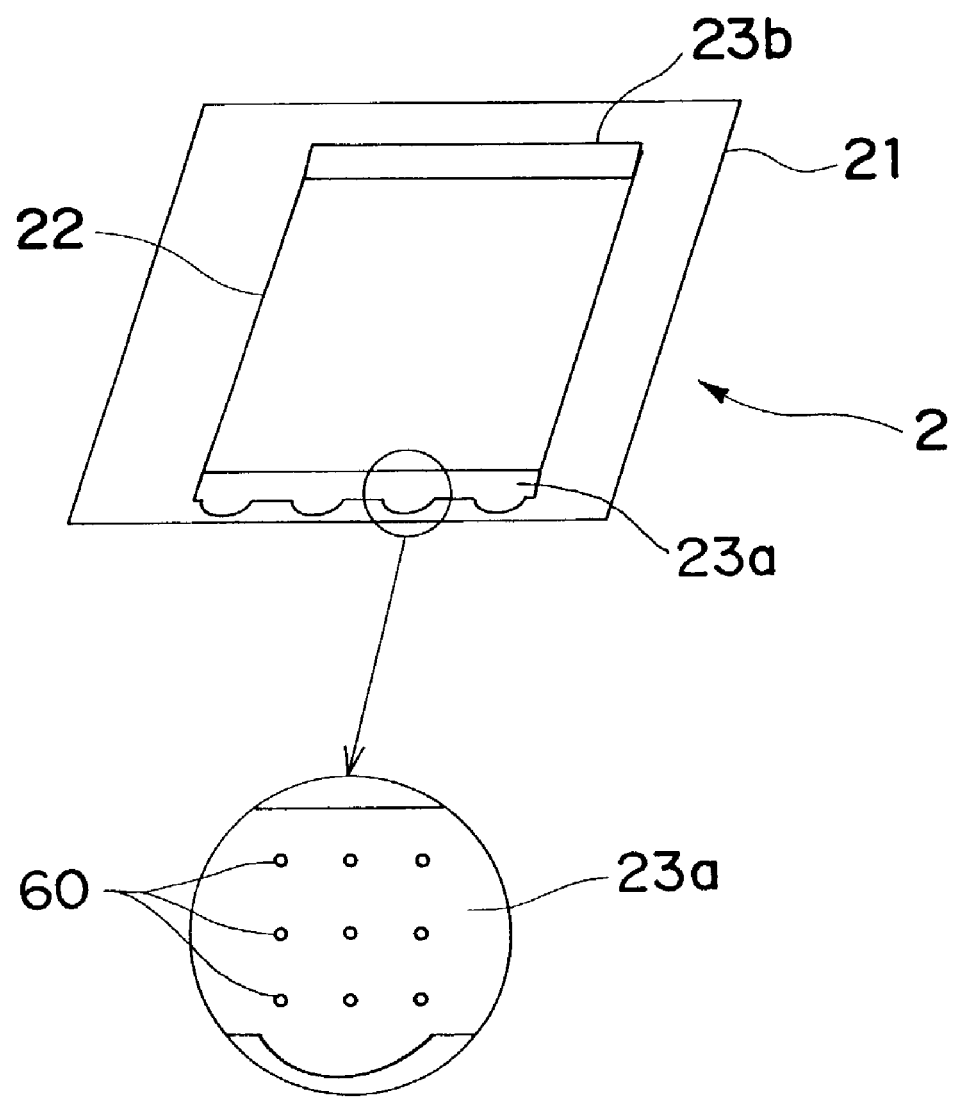
FIG. 14 is an explanatory diagram of a second transparent insulating base of a second conductive panel 2 having dot-like spacers in the wide range-inputable touch panel according to the embodiment of the present invention.

In the wide range-inputable touch panel according to the embodiment of the present invention, dot-like spacers 60 may be formed on a surface of the first transparent electrode 12 of the first conductive panel 1 on the side for touch input or on a surface of the second transparent electrode 22 of the second conductive panel 2 on the screen side (see FIG. 14). For obtainment of the dot-like spacers, transparent photosetting resin such as acrylate resin including melamine acrylate resin, urethane acrylate resin, epoxy acrylate resin, methacrylacrylate resin, and acrylacrylate resin, and polyvinyl alcohol resin may be shaped into minute dots by a photo process. A large number of minute dots as the spacers may be formed by the printing process. For obtainment of the spacers, dispersion of particles of inorganic substance or organic substance may be sprayed or applied and then dried.

Dot-like spacers may be provided in the spaces (the cut-out sections 31) formed in the adhesive layer 3 cut from the outer edge side thereof or in the spaces (the punched hole sections 32) formed as holes punched in the adhesive layer 3. On condition that areas of the spaces formed on the bus bar are large (see FIG. 5), in particular, the spacers ensure insulation between the bus bar and the transparent electrode of the conductive panel on the opposite side in the spaces when input operations are not executed.

In the cut-out sections 31 or the punched hole sections 32 of the adhesive layer 3, as shown in FIG. 6, the bus bar 23*a* is preferably covered with carbon layers 28. The cut-out sections 31 of the adhesive layer 3 open toward outside of the touch panel, and portions of the bus bar in the cut-out sections 31 that function as switches are accordingly exposed to outside air. Such covering with the carbon layers 28 can prevent oxidation of the bus bar 23*a*, without decreasing conductivity on a surface of the bus bar 23*a*.

Figure 15:
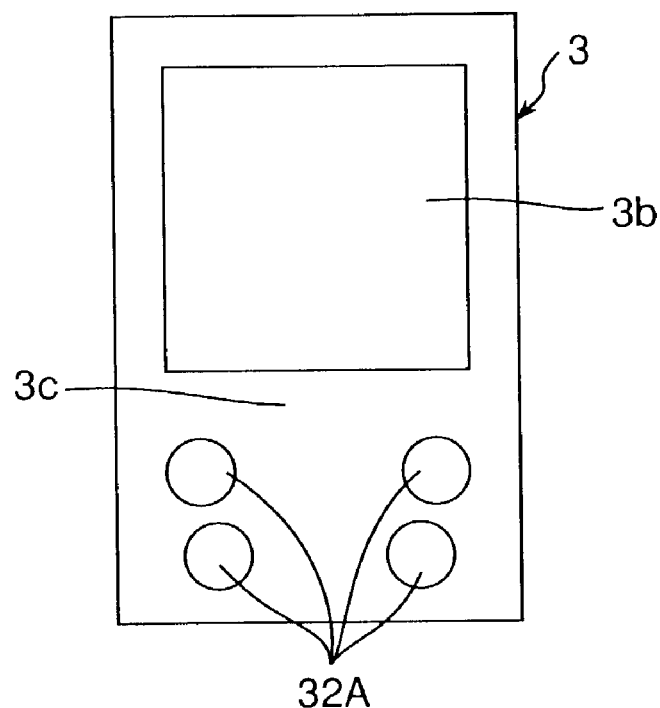
FIG. 15 is an explanatory diagram of an adhesive layer and an interconnection overcoating layer in the PDA of FIG. 12B.
Figure 15:
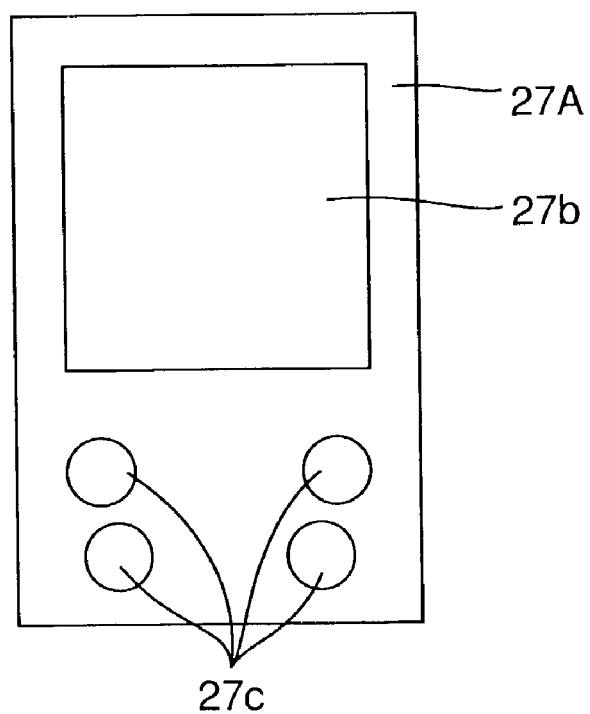

FIGS. 12A and 12B are the plan view and the exploded view showing the PDA (Personal Digital Assistants) as an example of a portable information device equipped with the wide range-inputable touch panel according to still another embodiment of the present invention. FIG. 13 is the exploded view showing the PDA equipped with the example of the conventional touch panel. In FIG. 12A, reference character 70 denotes a housing of the PDA, character 71 denotes a touch panel input section of the PDA that is an ordinary input section I, character 72 denotes input buttons of the PDA that is an additional input section II, and character 74 denotes the touch panel of the PDA. The conventional PDA of FIG. 13 is composed generally of two components, for a touch panel 90 having a configuration as shown in FIG. 11 and a membrane switch 91 are separately manufactured and are separately installed. In contrast to that, the PDA equipped with the wide range-inputable touch panel according to still another embodiment of the present invention, shown in FIGS. 12A and 12B, may be composed of one component as will be described below. That is, first bus bars 13*a* and 13*b* of a first transparent electrode 12 on a first conductive panel 1 on a side for touch input are configured so as to be longer than second bus bars 23*a* and 23*b* of a second transparent electrode 22 on a second conductive panel 2 on a screen side, and a third input area 12B for the additional input section II other than a first input area 12A for the ordinary input section I is formed so as to have a large area. On the other hand, a second input area 22A of the second transparent electrode 22 is formed so as to be generally as large as the first input area 12A, and four circular additional electrode sections 23*d*, . . . , 23*d* for a membrane switch substitutional switch section are formed and connected through extension line sections 23*c* to one of the second bus bars 23*a* on a second transparent insulating base 21 of the second conductive panel 2. In the PDA, in the same manner as the above embodiment, the ordinary input section I may be composed of the first input area 12A of the first transparent electrode 12 and the second input area 22A of the second transparent electrode 22 that face each other through the region 3*b* of the adhesive layer 3 through which a screen of LCD or the like can be seen for input operations, as shown in FIG. 15, and the additional input section II may be composed of the third input area 12B of the first transparent electrode 12 and the additional electrode sections 23*d*, . . . , 23*d* that face each other through the cut-out sections 31 of the adhesive layer 3. FIG. 15 is an explanatory diagram of the adhesive layer 3 and an interconnection overcoating layer 27A of the PDA of FIG. 12B, through holes 3*b* and 27*b* are provided in regions of the layers that correspond to the second input area 22A of the second transparent electrode 22, and punched holes 32A, . . . , 32A, and 27*c*, . . . , 27*c* are provided in regions of the layers that correspond to the additional electrode sections 23*d*, . . . , 23*d*. The third input area 12B of the first transparent electrode 12 for the membrane switch substitutional switch section is formed on the first transparent insulating base 11 of the first conductive panel 1 in the same manner as the first input area 12A of the first transparent electrode 12, and the additional electrode sections 23*d*, . . . , 23*d* of the second transparent electrode 22 are formed on the second transparent insulating base 21 of the second conductive panel 2 in the same manner as the second input area 22A of the second transparent electrode 22. Thus a membrane switch is incorporated into the touch panel, on the whole, and the PDA can be composed of one component.

Arbitrary embodiments among the above-mentioned various embodiments may be combined appropriately so that the effects the embodiments have may be achieved.

The wide range-inputable touch panels according to the present invention, having such configurations and functions as described above, achieve the following effects.

In the touch panel of analog resistance film type having the first conductive panel composed of the first transparent insulating base, the first bus bars, and the first transparent electrode, and the second conductive panel composed of the second transparent insulating base, the second bus bars, and the second transparent electrode, the third input area projecting out from between the first bus bars is formed in addition to the first input area between the first bus bars of the first transparent electrode, the first conductive panel and the second conductive panel are made to face each other and are stuck together in circumferential portions thereof with the insulating adhesive layer so that the first and second bus bars are rectangularly arranged, and the adhesive layer has the space sections that are arranged between at least one bus bar of the pair of second bus bars and the third input area of the first transparent electrode and that permit the bus bar and the third input area to be brought into electrical contact with each other by a press.

To be more specific, the touch panel of analog resistance film type in which each of the conductive panels has the routing circuit connected to the bus bars is configured so that at least one bus bar and the transparent electrode on the conductive panel fronting the bus bar through the spaces formed in the adhesive layer cut out from the outer edge side thereof face each other so as to be capable of making electrical contact with each other by a press. Alternatively, the touch panel of analog resistance film type in which one conductive panel has the routing circuit connected to the bus bars on the panel and the routing circuit connected to the bus bars on the opposite panel is configured so that at least one bus bar on the conductive panel having the routing circuits collectively and the transparent electrode on the conductive panel fronting the bus bar through the spaces formed in the adhesive layer cut out from the outer edge side thereof face each other so as to be capable of making electrical contact with each other by a press.

With this configuration, the third input area is added besides the first input area where the transparent electrodes face each other, a larger number of input operations may be made with one display operation on the screen, and input operations may be made over a wider area than in conventional configurations.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A wide range-inputable touch panel of analog resistance film type, the touch panel comprising:
    a first transparent insulating base;
    a pair of first bus bars arranged in parallel to each other on one surface of the first transparent insulating base;
    a first transparent electrode having at least a first input area between the first bus bars;
    a second transparent insulating base;
    a pair of second bus bars arranged in parallel to each other on one surface of the second transparent insulating base; and
    a second transparent electrode having a second input area between the second bus bars that corresponds to the first input area,
    wherein the first transparent insulating base, the first bus bars, and the first transparent electrode compose a first conductive panel, and the second transparent insulating base, the second bus bars, and the second transparent electrode compose a second conductive panel,
    wherein the first transparent electrode further comprises a third input area that is adjacent to the first input area and that corresponds to at least one bus bar of the pair of second bus bars,
    wherein the touch panel further comprises:
    an insulating adhesive layer that sticks together circumferential portions of the first and the second conductive panels facing each other so that the first and the second bus bars are arranged rectangularly, wherein the insulating adhesive layer has space sections provided between at least the one bus bar of the pair of second bus bars and the third input area of the first transparent electrode so as to allow the one bus bar and the third input area to be brought into electrical contact with each other by a press; and
    first and second routing circuits connected respectively to the first and the second bus bars on the conductive panels,
    wherein the space sections are spaces formed in the adhesive layer cut out from an outer edge side thereof.

2. A wide range-inputable touch panel of analog resistance film type as claimed in claim 1, wherein the first and the second routing circuits are provided on the first and the second conductive panels, respectively, and are connected to the first and the second bus bars, respectively.

3. A wide range-inputable touch panel of analog resistance film type as claimed in claim 1, wherein the first and the second routing circuits are provided on the second conductive panel and are connected to the first and the second bus bars, respectively.

4. A wide range-inputable touch panel as claimed in claim 1, wherein an insulating interconnection overcoating layer is formed on a surface of the first conductive panel where the first routing circuit is formed or on a surface of the second conductive panel where the second routing circuit is formed, in an area that does not overlap portions of the bus bars on the surface which can be brought into electrical contact by a press with a facing transparent electrode and in an area including the first or second routing circuit.

5. A wide range-inputable touch panel as claimed in claim 1, wherein at least the one bus bar of the pair of bus bars is covered with carbon layers in cut-out sections of the adhesive layer.

6. A wide range-inputable touch panel as claimed in claim 1, wherein the adhesive layer has a through hole formed corresponding to the first input area of the first transparent electrode and to the second input area of the second transparent electrode and has a partition section that partitions the through hole and the space sections.

7. A wide range-inputable touch panel as claimed in claim 1, wherein an ordinary input section as a region through which a screen placed under the touch panel can be seen for input operations is composed of the first input area of the first transparent electrode and of the second input area of the second transparent electrode that faces the first input area, and an additional input section different from the ordinary input section is composed of at least one bus bar of the pair of second bus bars and of the third input area of the first transparent electrode that faces at least the one bus bar.

8. A wide range-inputable touch panel as claimed in claim 7, wherein the additional input section is composed of additional electrode sections that are connected through extension line sections to at least one bus bar of the pair of second bus bars, and the third input area of the first transparent electrode that faces the additional electrode sections through the space sections.

9. A wide range-inputable touch panel as claimed in claim 1, wherein dot-like spacers are provided in the spaces.

10. A wide range-inputable touch panel of analog resistance film type, the touch panel comprising:
    a first transparent insulating base;

a pair of first bus bars arranged in parallel to each other on one surface of the first
transparent insultaing base; a first transparent electrode having at least a first input area between the first bus bars;
a second transparent insulating base;
a pair of second bus bars arranged in parallel to each other on one surface of the second transparent insulating base; and
a second transparent electrode having a second input area between the second bus bars that corresponds to the first input area,
wherein the first transparent insulatinig base, the first bus bars, and the first transparent electrode compose a first conductive panel, and the second transparent insulating base, the second bus bars, and the second transparent electrode compose a second conductive panel,
wherein the first transparent electrode further comprises a third input area that is adjacent to the first input area and that corresponds to at least one bus bar of the pair of second bus bars;
wherein the touch panel further comprises:
an insulating adhesive layer that sticks together circumferential portions of the first and the second conductive panels facing each other so that the first and the second bus bars are arranged rectangularly, wherein the insulating adhesive layer has space sections provided between at least the one bus bar of the pair of second bus bars and the third input area of the first transparent electrode so as to allow the one bus bar and the third input area to be brought into electrical contact with each other by a press; and
first and second routing circuits connected respectively to the first and the second bus bars on the conductive panels,
wherein the space sections are spaces in which two or more cut-out sections formed in the adhesive layer cut out from an outer edge side thereof exist side by side along one side.

11. A wide range-inputable touch panel as claimed in claim 10, wherein dot-like spacers are provided in the spaces.

12. A wide range-inputable touch panel of analog resistance film type as claimed in claim 10, wherein the first and the second routing circuits are provided on the first and the second conductive panels, respectively, and are connected to the first and the second bus bars, respectively.

13. A wide range-inputable touch panel of analog resistance film type as claimed in claim 10, wherein the first and the second routing circuits are provided on the second conductive panel and are connected to the first and the second bus bars, respectively.

14. A wide range-inputable touch panel as claimed in claim 10, wherein an insulating interconnection overcoating layer is formed on a surface of the first conductive panel where the first routing circuit is formed or on a surface of the second conductive panel where the second routing circuit is formed, in an area that does not overlap portions of the bus bars on the surface which can be brought into electrical contact by a press with a facing transparent electrode and in an area including the first or second routing circuit.

15. A wide range-inputable touch panel as claimed in claim 10, wherein at least the one bus bar of the pair of bus bars is covered with carbon layers in cut-out sections of the adhesive layer.

16. A wide range-inputable touch panel as claimed in claim 10, wherein the adhesive layer has a through hole formed corresponding to the first input area of the first transparent electrode and to the second input area of the second transparent electrode and has a partition section that partitions the through hole and the space sections.

17. A wide range-inputable touch panel as claimed in claim 10, wherein an ordinary input section as a region through which a screen placed under the touch panel can be seen for input operations is composed of the first input area of the first transparent electrode and of the second input area of the second transparent electrode that faces the first input area, and an additional input section different from the ordinary input section is composed of at least one bus bar of the pair of second bus bars and of the third input area of the first transparent electrode that faces at least the one bus bar.

18. A wide range-inputable touch panel as claimed in claim 17, wherein the additional input section is composed of additional electrode sections that are connected through extension line sections to at least one bus bar of the pair of second bus bars, and the third input area of the first transparent electrode that faces the additional electrode sections through the space sections.

* * * * *